United States Patent
Zhang et al.

(10) Patent No.: US 8,272,266 B2
(45) Date of Patent: Sep. 25, 2012

(54) GYROSCOPES USING SURFACE ELECTRODES

(75) Inventors: Wenhua Zhang, Sunnyvale, CA (US); Peter George Hartwell, Sunnyvale, CA (US); Lennie K Kiyama, Los Altos, CA (US); Robert G Walmsley, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 556 days.

(21) Appl. No.: 12/421,016

(22) Filed: Apr. 9, 2009

(65) Prior Publication Data

US 2010/0257934 A1   Oct. 14, 2010

(51) Int. Cl.
G01C 19/00 (2006.01)
G01P 3/44 (2006.01)
G01P 9/00 (2012.01)
G01P 15/08 (2006.01)

(52) U.S. Cl. .................... 73/504.12; 73/503.3; 310/309; 324/658; 324/662

(58) Field of Classification Search ............... 73/504.02, 73/504.04, 504.12
See application file for complete search history.

(56) References Cited

U.S. PATENT DOCUMENTS

| | | | |
|---|---|---|---|
| 4,336,718 A | 6/1982 | Washburn | |
| 5,205,171 A | 4/1993 | O'Brien et al. | |
| 5,349,855 A | 9/1994 | Bernstein et al. | |
| 5,672,949 A | 9/1997 | Ward | |
| 5,719,336 A | 2/1998 | Ando et al. | |
| 5,753,817 A | 5/1998 | Park et al. | |
| 5,894,091 A | 4/1999 | Kubota | |
| 6,041,653 A | 3/2000 | Ichikawa et al. | |
| 6,181,050 B1* | 1/2001 | Taussig et al. | 310/309 |
| 6,223,598 B1 | 5/2001 | Judy | |
| 6,257,057 B1 | 7/2001 | Hulsing, II | |
| 6,481,285 B1 | 11/2002 | Shkel et al. | |
| 6,557,415 B2 | 5/2003 | Stewart et al. | |
| 6,591,678 B2 | 7/2003 | Sakai | |
| 6,657,444 B2 | 12/2003 | Fasen | |
| 7,036,373 B2 | 5/2006 | Johnson et al. | |
| 7,119,550 B2 | 10/2006 | Kitano et al. | |
| 7,142,500 B2 | 11/2006 | Fasen et al. | |
| 7,197,928 B2 | 4/2007 | Chen et al. | |
| 7,343,801 B2 | 3/2008 | Kapser et al. | |
| 7,484,411 B2 | 2/2009 | Walmsley | |
| 2002/0179983 A1* | 12/2002 | Hartwell et al. | 257/415 |
| 2008/0236279 A1* | 10/2008 | Matsuhisa | 73/504.12 |
| 2009/0190254 A1* | 7/2009 | Jandric et al. | 360/110 |

* cited by examiner

Primary Examiner — Harshad R Patel
Assistant Examiner — Roger Hernandez-Prewitt

(57) ABSTRACT

Gyroscopes using surface electrodes are provided. In this regard, a representative microelectromechanical systems (MEMS) gyroscope, among others, includes a top substrate and a bottom substrate. The top substrate includes an outermost structure that is open and enclosed and a first driving structure that is disposed within the outermost structure and includes first driving electrodes disposed on a bottom surface. The bottom substrate is disposed below the top substrate and includes second driving electrodes disposed on a top surface of the bottom substrate. The second driving electrodes are substantially aligned below the first driving electrodes such that a force can be applied to the first driving structure by an electrostatic force generated between the first and second driving electrodes. The first and second driving electrodes are also configured to provide a capacitance signal based on the movement of the first driving structure.

27 Claims, 10 Drawing Sheets

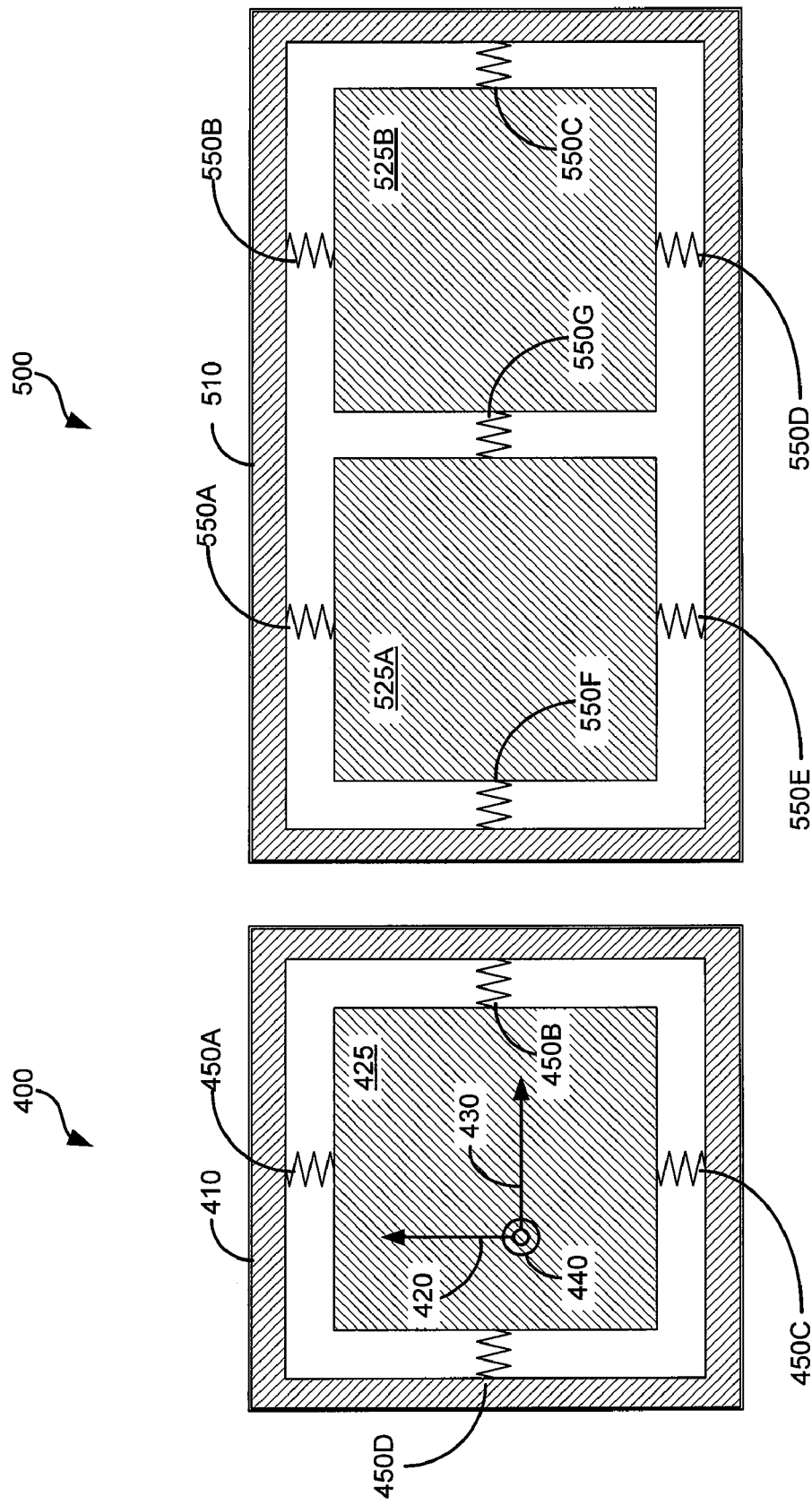

GYROSCOPES USING SURFACE ELECTRODES

BACKGROUND

Gyroscopes are devices that measure or maintain orientation based on principles of angular momentum. Microelectromechanical systems (MEMS) gyroscopes can be used in many applications, such as, vehicle stability control, rollover detection, navigation, load leveling/suspension control, computer input devices, handheld computing devices, game controllers, navigation of autonomous guided vehicles, and among others. Many MEMS gyroscopes are designed for high performance with little consideration for efficient area usage. For example, in comb-finger type gyroscopes, typically a limited percentage of total device area is allocated for sensors.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4-15 are top views of various embodiments of gyroscopes including surface electrodes, such as that shown in FIG. 1, according to the present disclosure.

DETAILED DESCRIPTION

Exemplary systems are first discussed with reference to the figures. Although these systems are described in detail, they are provided for purposes of illustration only and various modifications are feasible. This disclosure focuses on gyroscope platforms, where surface electrode technology is used in Coriolis force based microelectromechanical systems (MEMS) gyroscopes (rotational rate sensor). Surface electrode technology used in electrostatic actuators has been described in previous patents, such as U.S. Pat. No. 5,986,381. It should be noted that the disclosed gyroscope platforms can potentially be combined with other driving/sensing technologies, e.g. combfinger, parallel plate capacitor, piezoelectric, or piezoresistive materials, among others.

Figure 1:
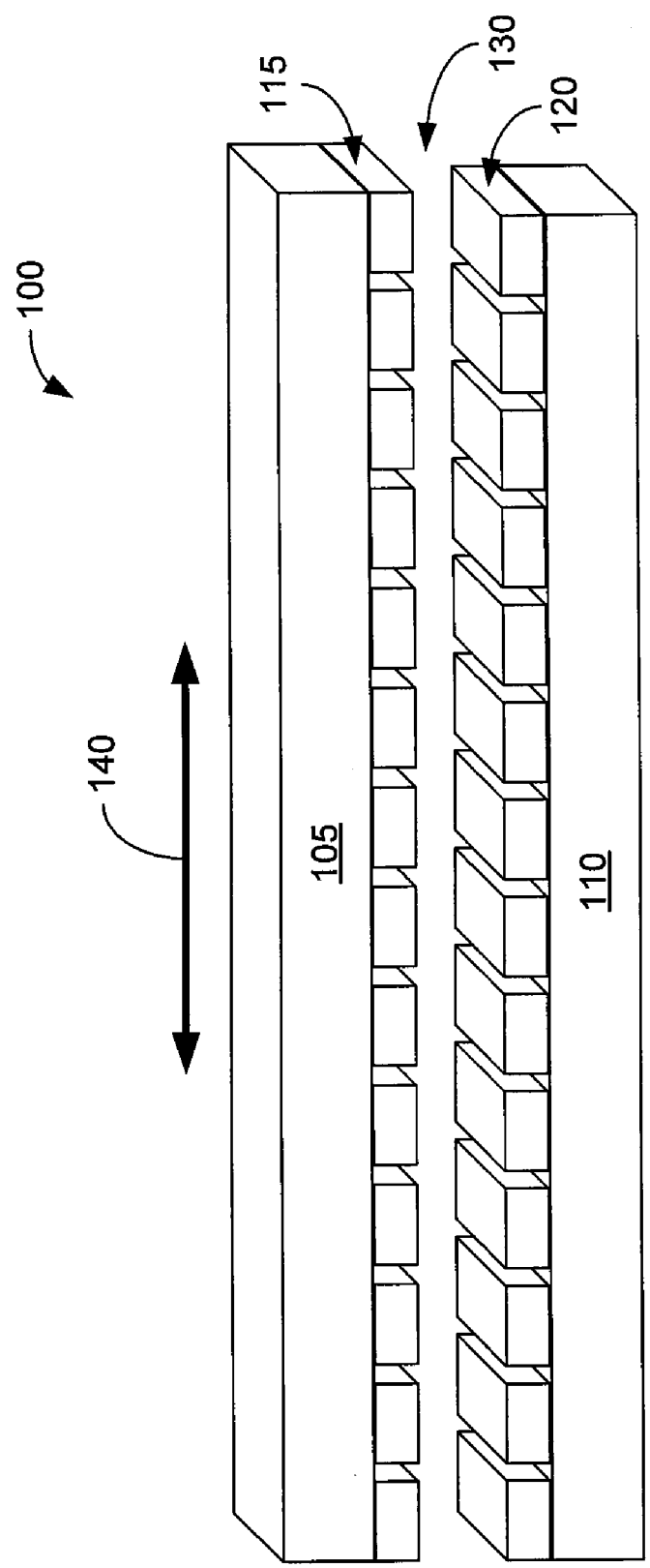
FIG. 1 is a side view of an embodiment of surface electrodes that can be used in a gyroscope according to an embodiment of the present disclosure.

FIG. 1 is a side view of an embodiment of surface electrodes that can be used in a gyroscope. The embodiment of FIG. 1 includes a first substrate 105 and a second substrate 110. In general, electrodes, 115 and 120, are attached to opposite surfaces of the substrates, 105 and 110 respectively, such that the surface electrodes 115 and 120 face each other across a gap 130. By applying appropriate voltage patterns to the sets of electrodes 115 and 120, an electrostatic force can be generated between electrodes 115 and 120 attached to substrates 105 and 110, respectively, to produce motion 140 of the first substrate 105 relative to the second substrate 110 in a direction parallel to the gap 130 between the opposing electrode sets 115 and 120. In some embodiments, the second substrate 110 is used as a stationary frame of reference. In those embodiments, the first substrate 105 and the first set of electrodes 115 may be referred to as a rotor wafer, while the second substrate 110 and the second set of electrodes 120 may be referred to as a stator wafer.

The sets of electrodes, 115 and 120, attached to the substrates, 105 and 110 respectively, may also be used to detect the relative motion between substrates 105 and 110 by detecting capacitance changes between the electrodes within the electrode sets 115 and 120. On each substrate 105 and 110, the electrodes 115 and 120 may be formed into several groups depending on specific applications, so that a voltage pattern can be applied to the groups of the electrodes 115 and 120. The pattern can alternate periodically in the moving direction. It should be noted that specific applications of surface electrode technology include actuation technologies using alternating voltage patterns, which have been described in U.S. Pat. No. 5,986,381, and sensing technologies using time-varying input signals, which have been described in U.S. Pat. No. 6,657,444.

The surface electrodes may be configured as periodic arrays which provide an in-plane actuation force and/or capacitance position sensing of lateral displacement from the fixed stator wafer (e.g., the second substrate 110 and electrodes 120) to any moving part of the rotor wafer (e.g., the first substrate 105 and electrodes 115) along any chosen vector. Since a gyroscope requires at least two separate moving components within the gyroscope structure, actuating and sensing is required in at least two separately optimized electrode arrays, which are properly oriented with respect to the motion direction of the gyroscope sub-components. The structures herein disclosed combined with the surface electrode technology may offer one or more of the following advantages over current comb-finger based MEMS gyroscopes: (i) arbitrary displacement range; (ii) sensing and forcing vectors determined by patterning of metal layers rather than etching of mechanical structures; (iii) improved force and capacitance position signal per unit area; (iv) all sensing and actuation referenced to single mechanical ground, i.e., no suspended reference or "fixed" half of sensor/actuator; (v) area efficient since sensor/actuator arrays are underneath moving structures rather than in the same plane; (vi) large mass and thermally-stable single-crystal silicon structures reduce both broadband noise as well as low frequency 1/f-like noise associated with thermally-driven structural distortion; and (vii) electrode and mechanical structures for out-of-plane motion of a MEMS gyroscope sub-component may also be incorporated. Many of these advantages are illustrated in the following exemplary embodiments of possible gyroscope designs including surface electrodes.

Figure 2:
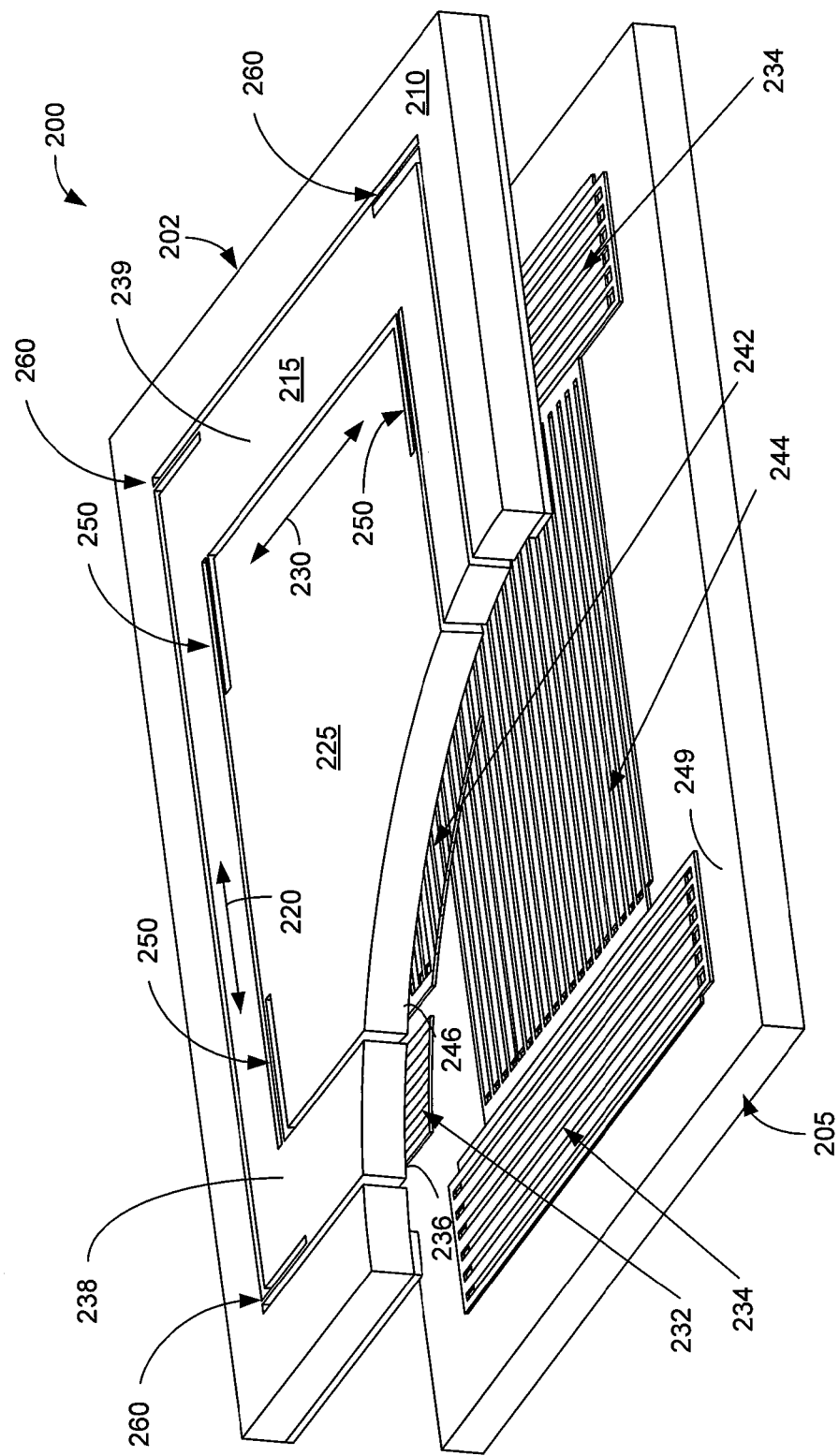
FIG. 2 is a cut-away view of a gyroscope including surface electrodes, such as that shown in FIG. 1, according to an embodiment of the present disclosure.
Figure 6:
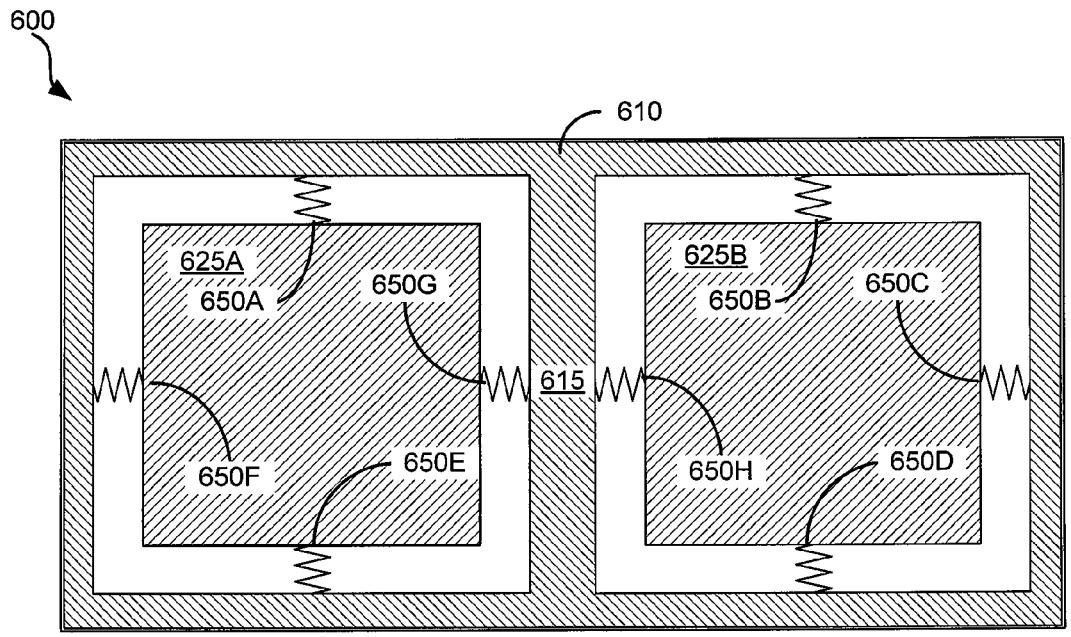

FIG. 2 is a cut-away view of an embodiment of a gyroscope 200 that includes surface electrodes, such as that shown in FIG. 1, according to an embodiment of the present disclosure. The gyroscope 200 includes a top substrate 202 and a bottom substrate 205. The top substrate 202 comprises an outermost structure 210, one or more sensing structures 215, and one or more driving structures 225. In this example, the outermost structure 210 and the sensing structure 215 are open and enclosed similar to that of a window frame. The outermost structure 210 is generally fixed and does not move. The driving structure 225 is connected to and supported by the sensing structure 215 using flexural suspension elements 250 (e.g., flexural microbeams and/or pivot members), which allow motion of the driving structure 225 in the direction 230 which is orthogonal to the composite motion 220 allowed by flexural suspension elements 260. The sensing structure 215 and the driving structure 225 are disposed within and supported by the outermost structure 210 using flexural suspension elements 260 (e.g., flexural microbeams and pivot members). These flexural suspension elements 260 and 250 allow motion of the composite structure that includes the sense structure 215 and the drive structure 225. FIG. 6 shows the top view of a symbolic representation of gyroscope 200 where the flexural suspension elements 260 are represented by symbolic springs 750A and 750C while the flexural suspension elements 250 are represented by the symbolic springs, 750B and 750D.

The sensing structure 215 includes first sensing electrodes 232 that are disposed on a bottom surface 236 of the sensing structure 215 and aligned parallel to at least one side wall 238 and/or 239 of the sensing structure 215. In the exemplary embodiment of FIG. 2, the first sensing electrodes 232 are disposed on the bottom surface 236 of the left and right side walls 238 and 239 of the sensing structure 215. The driving structure 225 includes first driving electrodes 242 that are disposed on a bottom surface 246 of the driving structure 225. The first driving electrodes 242 are disposed adjacent to and perpendicular to the first sensing electrodes 232.

The bottom substrate 205 is disposed below the top substrate 202 and includes second sensing electrodes 234 and second driving electrodes 244 that are disposed on a top surface 249 of the bottom substrate 205 and substantially below the first sensing electrodes 232 and the first driving electrodes 242, respectively. The first and second sensing electrodes 232 and 234 and the first and second driving electrodes 242 and 244 provide a capacitance signal based on the movement of the sensing structure 215 and the driving structure 225, respectively. The capacitance signal (e.g., a change in voltage or current due to a change in a change in capacitance between the sensing electrodes) is generated based on the sensing structure 215 and driving structure 225 moving perpendicular to the second sensing electrodes 234 and second driving electrodes 244 in the horizontal direction 220 and vertical direction 230, respectively. In some embodiments, a capacitance signal is produced based on rotational movement between the electrodes.

Operation of the gyroscope 200 is based on the principle of coupling two orthogonal degrees-of-freedom of a suspended spring-mass structure. The sensing structure 215 and driving structure 225 are generally mass-damping-spring structures. The dynamic mode of the sensing structure 215 and driving structure 225 can be translational and/or rotational, which depends on the operational principles. In one embodiment, the driving electrodes 242 between the driving structure 225 and the bottom substrate 205 provide an electrostatic force to vibrate the driving structure 225 at a controlled amplitude and frequency when a voltage pattern is applied. Energy from the vibrating driving structure 225 is transferred to the sensing structure 215, which is tuned to receive energy only at the drive frequency and only through coupling by the Coriolis force when the gyroscope is rotated around its input axis. The sensing electrodes 234 between the sensing structure 215 and the bottom substrate 205 provide a capacitance signal when the sensing structure 215 is moving. By capacitively detecting the sensing structure movement using the sensing electrodes 234, the rotational signal can be detected. The driving and sensing mechanisms may use two-phase, three-phase or some other appropriate scheme. In addition, multiple driving structures may be utilized for sensing based on corresponding driving electrodes providing a capacitance signal based on the movement of the driving structure.

Figure 3:
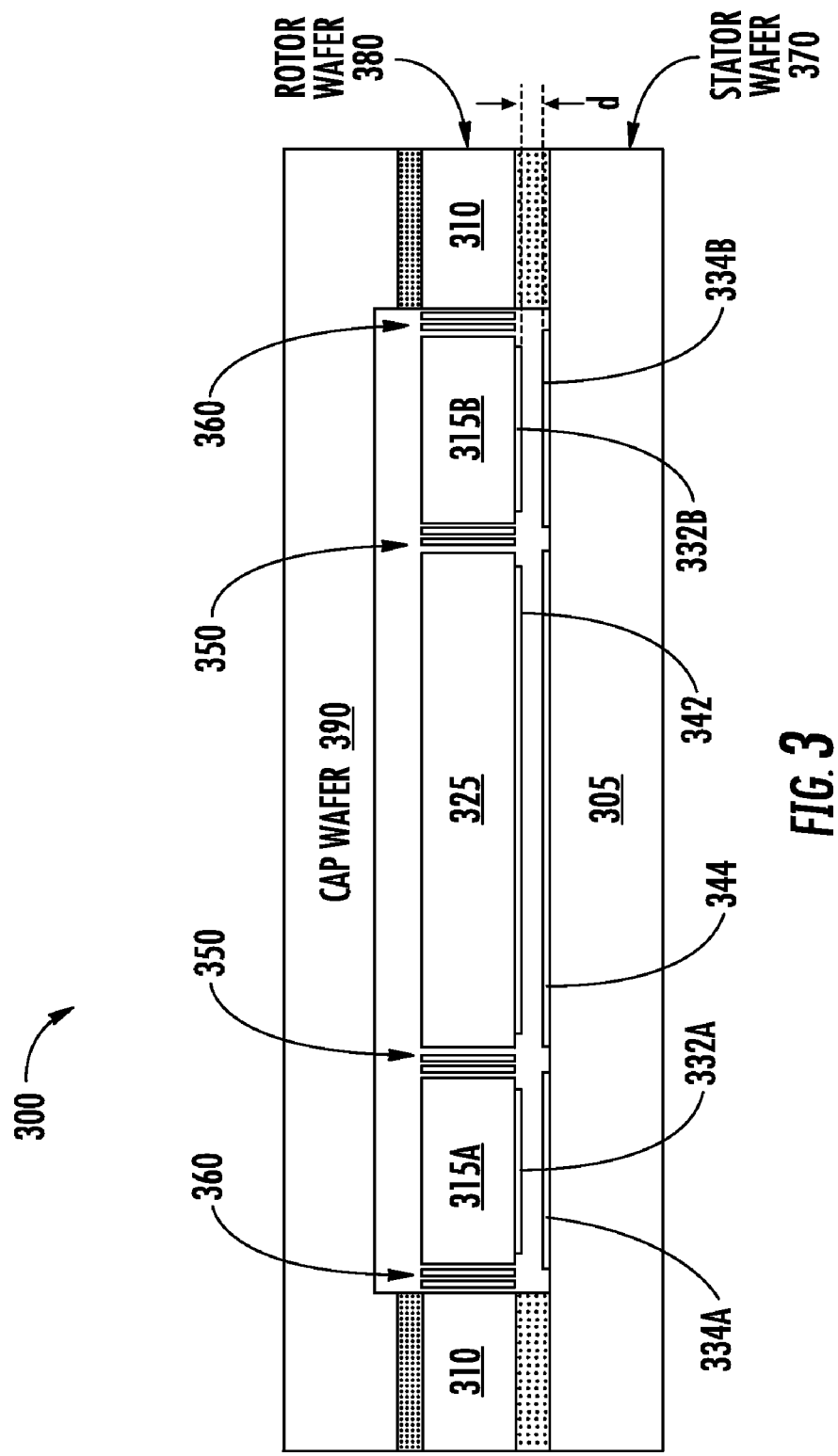
FIG. 3 is a cross-sectional drawing of a three-wafer gyroscope including surface electrodes, such as that shown in FIG. 1, according to an embodiment of the present disclosure.

FIG. 3 is a cross-sectional drawing of a three-wafer gyroscope 300 including surface electrodes, such as that shown in FIG. 1, according to an embodiment of the present disclosure. The gyroscope 300 of FIG. 3 includes three layers, or "wafers", a stator wafer 370, a rotor wafer 380, and a cap wafer 390. The stator wafer 370 includes a substrate 305 and fixed surface electrodes 334A-B and 344 disposed on the top surface of the substrate 305. Substrate 305 provides a common ground reference for the surface electrodes 334A-B and 344. The rotor wafer 380 comprises a substrate including an outermost structure 310, one or more sensing structures 315A-B, and one or more driving structures 325. The driving structure 325 is supported by the sensing structure 315A-B using flexural suspension elements 350 (e.g., flexural microbeams and/or pivot members). The sensing structure 315A-B and the driving structure 325 are supported by the outermost structure 310 using flexural suspension elements 360.

The sensing structures 315A-B include sensing electrodes 332A-B disposed on the bottom surface of the sensing structures 315A-B, respectively. The driving structure 325 includes driving electrodes 342 disposed on the bottom surface of the driving structure 325. When the rotor wafer 380 is fixed to the stator wafer 370, the sensing and driving electrodes, 332A-B and 342, of the rotor wafer 380 are substantially aligned with the sensing and driving electrodes, 334A-B and 344 respectively, of the stator wafer 370.

In the embodiment of FIG. 3, the addition of the cap wafer 390 protects the driving and sensing structures 325 and 315A-B of the rotor wafer 380. In addition, when the three wafers are hermetically sealed together, an internal vacuum may be provided to improve signal-to-noise performance of the gyroscope 300 by reducing the mechanical damping of the sensing and driving structures. In other embodiments, a cap wafer 390 may not be included.

Alternatively or additionally, a gyroscope can include combinations of one or more sensing structures and one or more driving structures, which can include combinations of identical or different sensing structures and combinations of identical or different driving structures. In case of multiple sensing structures and the driving structures, the structures can be independent or coupled. The coupling mechanisms may be implemented using electrostatic/mechanical methods.

Examples of gyroscopes discussed in the current disclosure are based on the principle of coupling two orthogonal degrees-of-freedom of a suspended spring-mass structure. One or more driving structures within the gyroscope are driven to vibrate at a controlled amplitude and frequency. Energy from this vibrating driving structure is transferred to another resonant spring-mass sensing structure that is tuned to receive energy at the driven frequency and through coupling by the Coriolis force when the gyroscope is rotated around its input axis. The amplitude of the vibrational motion of the sensing structure is proportional to the rotation rate about the input axis. The surface electrodes provide both the electrostatic force to create vibration in the driving structure as well as allowing the motion of the sensing structure to be measured through capacitive changes between electrodes. Forces may be applied or capacitance position signals sensed in any of the 6 degrees-of-freedom (3 translation and 3 rotation) by appropriate design and patterning of the two surface electrode arrays, one on the moving structure (e.g., rotor wafer) and one on the fixed structure (e.g., stator wafer), that in combination constitute an actuating and/or sensing element.

FIG. 4 is a top view of an embodiment of a gyroscope, such as that shown in FIG. 2, and is denoted generally by reference numeral 400. Driving structure 425 includes both sensing electrodes and driving electrodes (not shown), but the sensing electrodes and driving electrodes move in different directions, e.g., driving electrodes in an X-axis direction 430 and sensing electrodes in a Y-axis direction 420. The gyroscope 400 measures the rotation rate around Z-axis 440. The driving structure 425 is supported to the outermost structure 410 using microbeams 450A-D. It should be noted that first sensing electrodes and first driving electrodes are disposed on the bottom surface of the driving structure 425.

It should be noted that second sensing electrodes and second driving electrodes (not shown) are disposed on the top surface of the bottom substrate (not shown) and below the first sensing electrodes and first driving electrodes of the driving structure 425. The sensing electrodes and the driving electrodes provide capacitance signal based on the movement of the driving structure 425, respectively.

FIG. 5 is a top view of another embodiment of a gyroscope, such as that shown in FIG. 2, and is denoted generally by reference numeral 500. The design and architecture of the gyroscope 500 is similar to the gyroscope 400 of FIG. 4 and includes first driving structure 525A that has first sensing electrodes and first driving electrodes. It should be noted that second sensing electrodes and second driving electrodes (not shown) are disposed on the top surface of the bottom substrate (not shown) and below the first sensing electrodes and first driving electrodes of the first driving structure 525A.

However, the gyroscope 500 further includes a second driving structure 525B that includes third sensing electrodes and third driving electrodes (not shown) on the bottom surface of the second driving structure 525B. The first and second driving structure 525A-B are within and supported to the outermost structure 510 using microbeams 550A-F. The first and second driving structures 525A-B are coupled together via a microbeam 550G. By controlling the driving forces applied to the first and second driving structures 525A and 525B, the reaction forces produced by the driving structures can interact to reduce mechanical vibration and/or noise propagation to the environment external to the gyroscope 500 or to other sensing structures within the same device.

It should be noted that fourth sensing electrodes and fourth driving electrodes (not shown) are disposed on the top surface of the bottom substrate (not shown) and below the third sensing electrodes and third driving electrodes of the second driving structure 525B. The third and fourth sensing electrodes and the third and fourth driving electrodes provide capacitance signal based on the movement of the second driving structure 525B, respectively.

FIG. 6 is a top view of another embodiment of a gyroscope, such as that shown in FIG. 2, and is denoted generally by reference numeral 600. The design and architecture of the gyroscope 600 is similar to the gyroscope 500 of FIG. 5 and includes first and second driving structures 625A-B. However, the first and second driving structures 625A-B are not coupled together. The outermost structure includes a divider 615 between the first driving structure 625A and the second driving structure 625B, which separates and decouples the first and second driving structures 625A-B. The first and second driving structures 625A-B are within and supported to the outermost structure 610 using microbeams 650A-F and the divider 615 using microbeams 650G-H, respectively.

Figure 7:
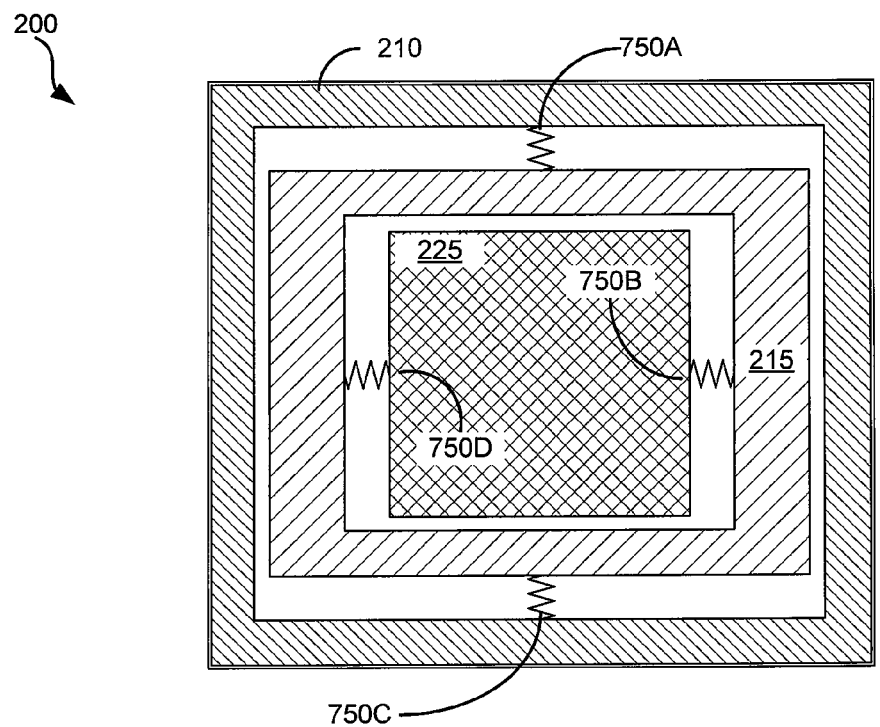

FIG. 7 is a top view of the gyroscope 200, which was described above in relation to FIG. 2. In this embodiment, separate sensing and driving structures, 215 and 225 respectively, are utilized.

Figure 8:
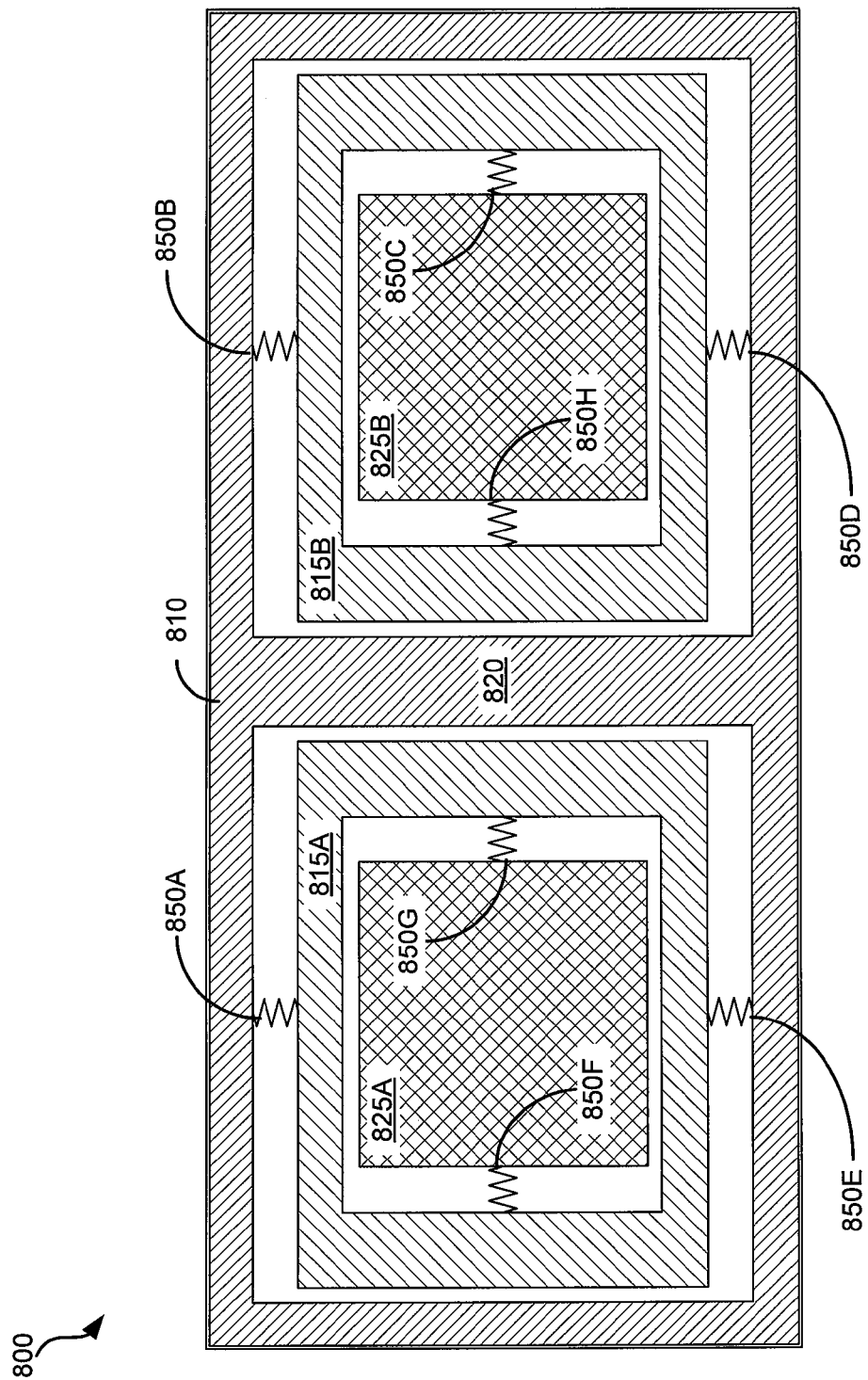

FIG. 8 is a top view of yet another embodiment of a gyroscope, such as that shown in FIG. 2, and is denoted generally by reference numeral 800. The design and architecture of the gyroscope 800 is similar to the gyroscope 200 of FIG. 7 and includes first sensing structure 815A and first driving structure 825A that are within and supported by the outermost structure 810 and the sensing structure 815A using microbeams 850A, E, F, and G, respectively. As with gyroscopes 500 and 600, the separate driving structures may be controlled so that the reaction forces produced by the driving structures can interact to reduce mechanical vibration and/or noise propagation to the environment external to the gyroscope 800 or to other sensing structures within the same device.

However, the gyroscope 800 further includes a second sensing structure 815B and second driving structure 825B. The outermost structure 810 includes a divider 820 between the first sensing structure 815A and the second sensing structure 815B, which separates and decouples the first sensing and first driving structures, 815A and 825A respectively, and the second sensing and second driving structures, 815B and 825B respectively. The second sensing structure 815B and second driving structure 825B are within and supported to the outermost structure 810 using microbeams 850B, D, H, and C, respectively.

Figure 9:
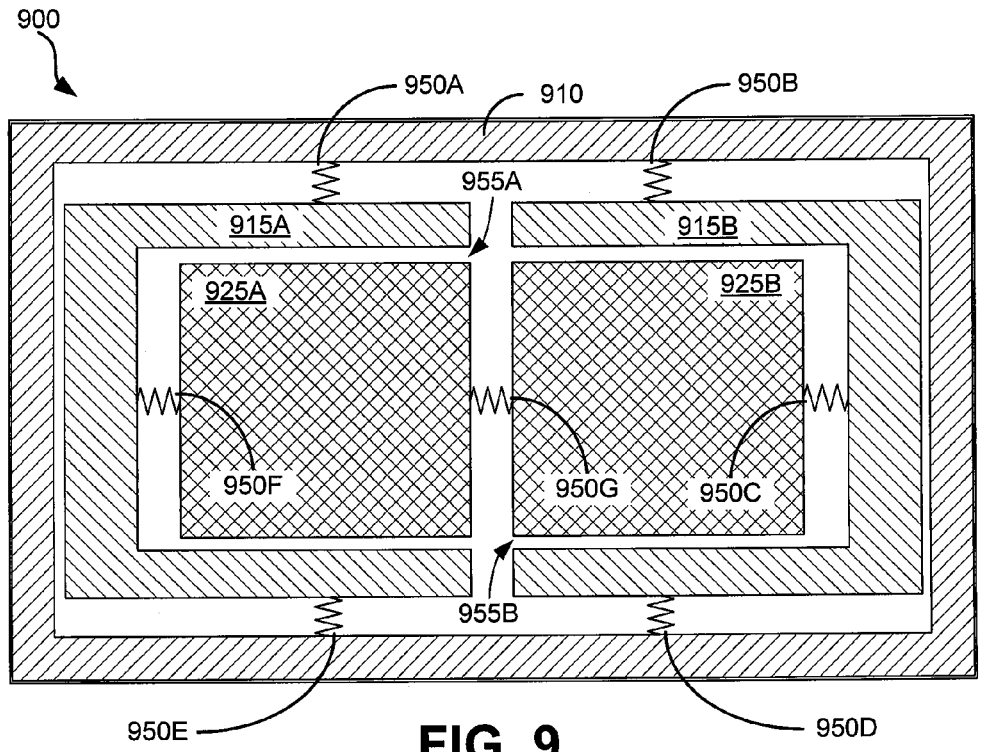

FIG. 9 is a top view of yet another embodiment of a gyroscope, such as that shown in FIG. 2, and is denoted generally by reference numeral 900. The gyroscope 900 includes first and second sensing structures 915A and 915B that have a C-shape. The first and second sensing structures 915A and 915B are within and supported to the outermost structure 910 using microbeams 950A, E, B, and D, respectively. First and second driving structures 925A and 925B are disposed within and supported to the first and second sensing structures 915A and 915B using microbeams 950F and 950C, respectively. The first and second driving structures 925A-B are coupled together via a microbeam 950G. The open ends 955A and 955B of the first and second sensing structures 915A and 915B are adjacent to each other.

Figure 10:
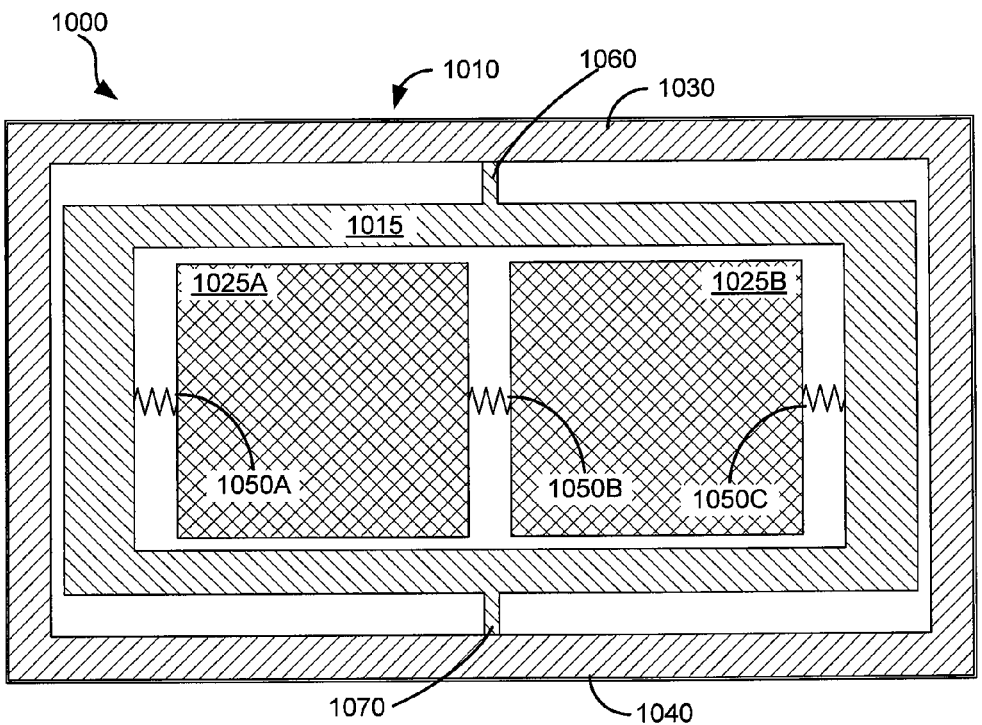

FIG. 10 is a top view of yet another embodiment of a gyroscope, such as that shown in FIG. 2, and is denoted generally by reference number 1000. The gyroscope 1000 comprises first and second driving structures 1025A and 1025B that are disposed within and supported to the sensing structure 1015 using microbeams 1050A and 1050C. The first and second driving structures 1025A and 1025B are coupled together via a microbeam 1050B. The sensing structure 1015 is within and pivotally attached to top and bottom walls 1030 and 1040 of the outermost structure 1010 using pivot members 1060 and 1070, respectively. The sensing structure 1015 is designed to rotate about a Y-axis and measure rotational rate about the Y-axis.

FIGS. 11-15 are embodiments of gyroscopes that allow measure the rotational rate about the Z-axis. As with the previous gyroscopes with multiple driving structures, the separate driving structures may be controlled so that the reaction forces produced by the driving structures can interact to reduce mechanical vibration and/or noise propagation to the environment external to the gyroscope or to other sensing structures within the same device.

Figure 11:
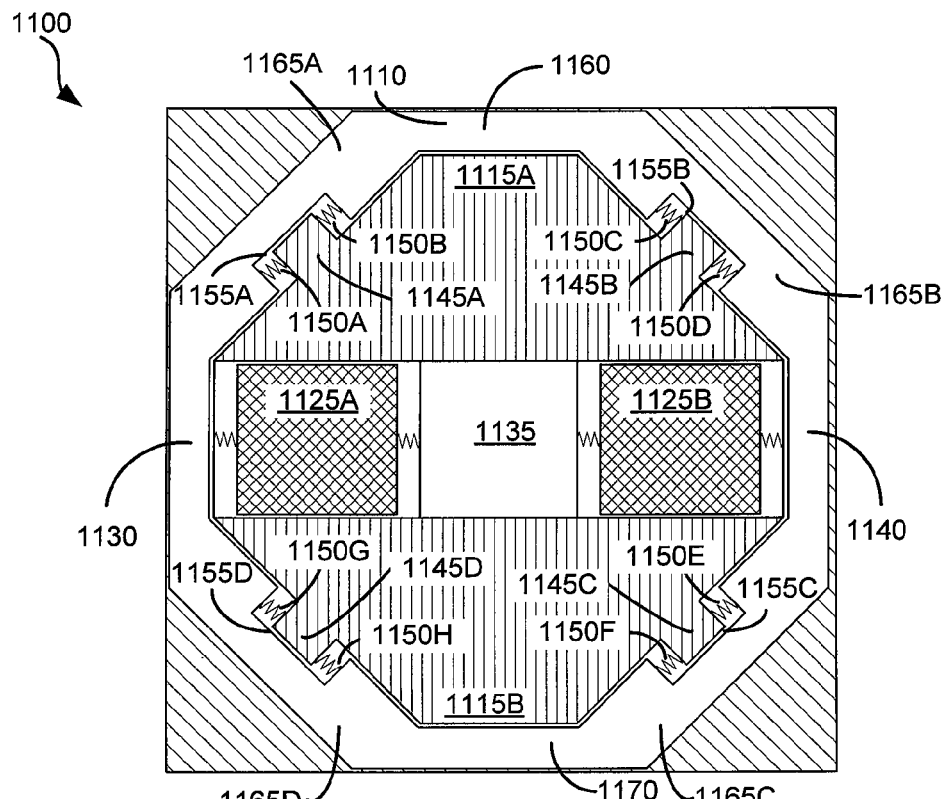

FIG. 11 is a top view of yet another embodiment of a gyroscope, such as that shown in FIG. 2, and is denoted generally by reference numeral 1100. The gyroscope 1100 includes an outermost structure 1110 having an octagon shape. The gyroscope 1100 further includes first and second driving structures 1125A and 1125B, and first and second sensing structures 1115A and 1115B, all of which are disposed within the outermost structure 1110. The first driving structure and the second driving structure 1125A and 1125B are further disposed between the first sensing structure and the second sensing structure 1115A and 1115B.

The first driving structure 1125A is disposed opposite from the second driving structure 1125B. A center member 1135 is disposed between the first and second driving structures 1125A and 1125B. The first and second driving structures 1125A and 1125B and the first and second sensing structures 1115A and 1115B are disposed adjacent to a left side wall 1130, right side wall 1140, top wall 1160, and bottom wall 1170 of the outermost structure 1110, respectively. Diagonal sides 1165A-D include female members 1155A-D that engage with the male members 1145A-D of the first and second sensing structures 1115A and 1115B using microbeams 1150A-H, respectively. The male members 1145A-D extend diagonally towards the female members 1155A-D, respectively.

The first sensing structure 1115A includes first and second sensing electrodes (not shown), and the second sensing structure 1115B includes third and fourth sensing electrodes (not shown). The first, second, third, and fourth sensing electrodes are aligned substantially diagonally from the top left, top right, bottom right, and bottom left, respectively, toward the center of the gyroscope 1100. The first sensing electrodes are opposite from the third sensing electrodes and the second sensing electrodes are opposite from the fourth sensing electrodes. The first and second driving structures 1125A and 1125B include first and second driving electrodes (not shown) that are aligned parallel to the left and right side walls 1130 and 1140 of the outermost structure 1110. The first and second driving structures 1125A and 1125B measure movement in the X-axis direction and the first and second sensing structures 1115A and 1115B move rotationally and measure the rotational rate about the Z-axis.

Figure 12:
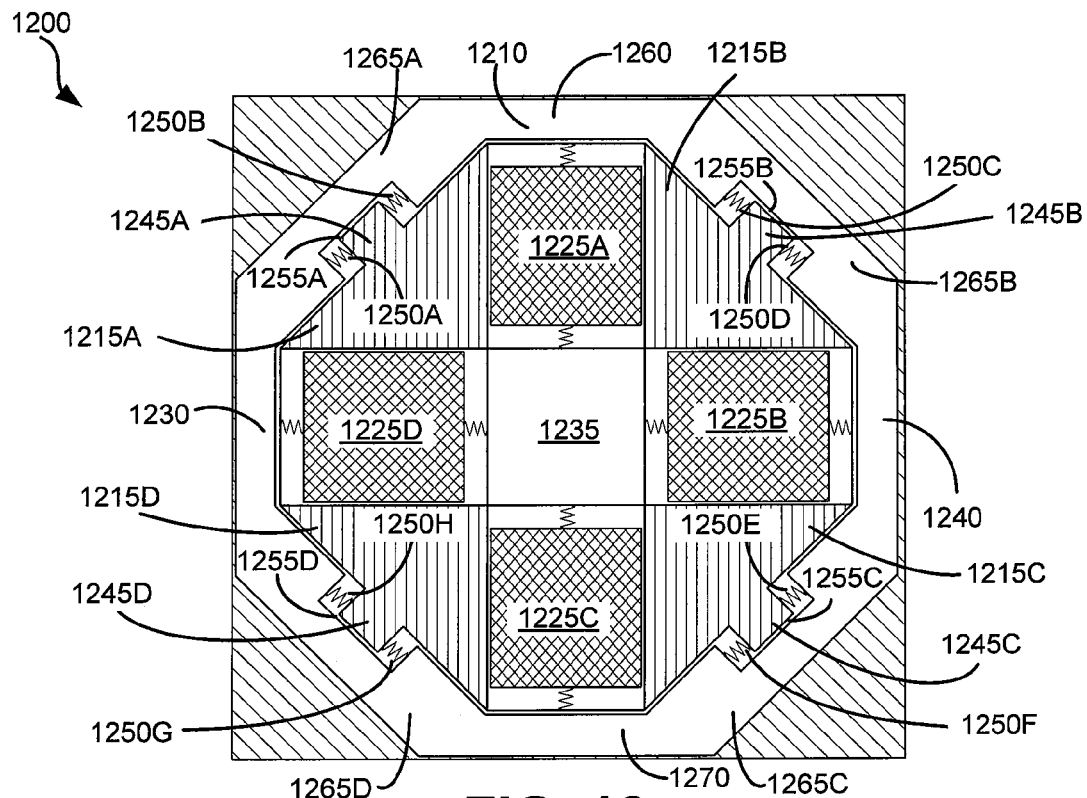

FIG. 12 is a top view of yet another embodiment of a gyroscope, such as that shown in FIG. 2, and is denoted generally by reference numeral 1200. The design and architecture of the gyroscope 1200 is similar to the gyroscope 1100 of FIG. 11, which includes an outermost structure 1210, the fourth and second driving structures 1225D and 1225B, and a center member 1235. The fourth and second driving structures 1225D and 1225B are disposed adjacent to left side wall 1230 and right side wall 1240, respectively. However, the gyroscope 1200 further includes first and third driving structures 1225A and 1225C that are disposed between the first and second sensing structures 1215A and 1215B and the third and fourth sensing structures 1215C and 1215D, respectively. The first and third driving structures 1225A and 1225C are disposed adjacent to top wall 1260 and bottom wall 1270, respectively. The first, second, third, and fourth sensing structures 1215A-D are disposed adjacent to diagonal sides 1265A-D, respectively.

The second driving structure 1225B and fourth driving structure 1225D are further disposed between the second and third sensing structure 1215B and 1215C, and the fourth and first sensing structure 1215D and 1215A, respectively. The diagonal sides 1265A-D include female members 1255A-D that engage with the male members 1245A-D using microbeams 1250A-H, respectively. The male members 1245A-D extend diagonally towards the female members 1255A-D, respectively. The fourth and second driving structures 1225D and 1225B move in the X-axis direction, and the first and third driving structures 1225A and 1225C move in the Y-axis direction. The sensing structures 1215A-D move rotationally and measure the rotational rate about the Z-axis.

The first and second sensing structures 1215A and 1215B include first and second sensing electrodes (not shown) respectively, and the third and fourth sensing structures 1215C and 1215D include third and fourth sensing electrodes (not shown) respectively. The first, second, third, and fourth sensing electrodes are aligned substantially diagonally from the top left, top right, bottom right, and bottom left, respectively, toward the center of the gyroscope 1200. The first sensing electrodes are opposite from the third sensing electrodes and the second sensing electrodes are opposite from the fourth sensing electrodes. The first and third driving structures 1125A and 1125C include first and third driving electrodes (not shown), respectively, that are aligned parallel to the top and bottom walls 1260 and 1270 of the outermost structure 1210. The second and fourth driving structures 1125B and 1125D include second and fourth driving electrodes (not shown), respectively, that are aligned parallel to the left and right side walls 1230 and 1240 of the outermost structure 1210. The first and third driving structures 1125A and 1125C measure movement in the X-axis direction, the second and fourth driving structures 1125B and 1125D measure movement in the Y-axis direction, and the sensing structures 1215A-D move rotationally and measure the rotational rate about the Z-axis.

Figure 13:
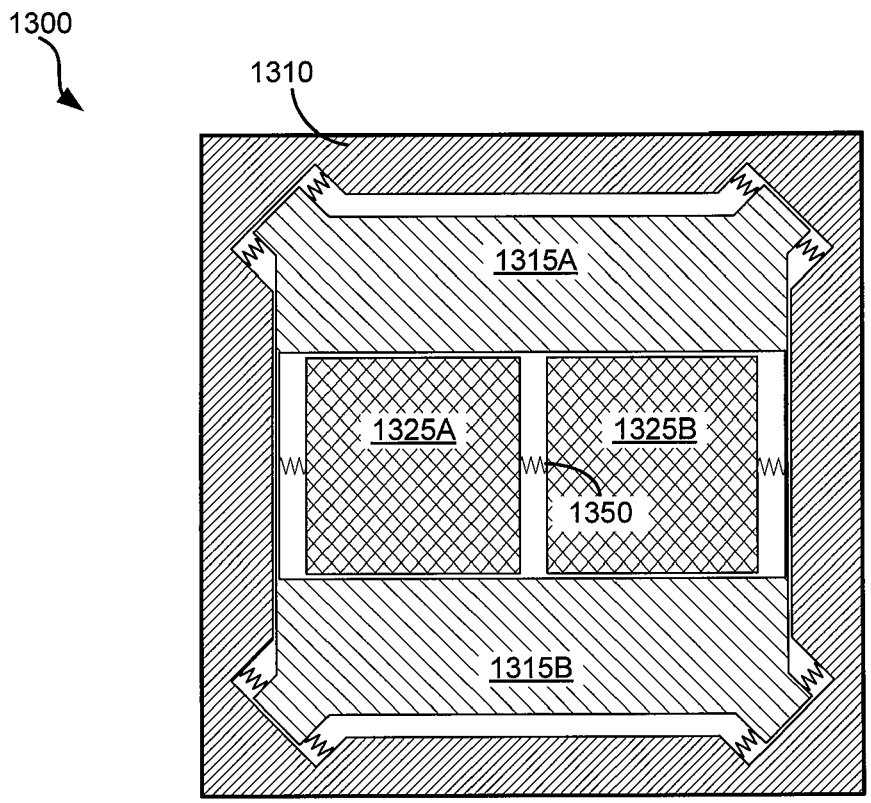

FIG. 13 is a top view of yet another embodiment of a gyroscope 1300, such as that shown in FIG. 2. The design and architecture of the gyroscope 1300 is similar to the gyroscope 1100 of FIG. 11, which includes an outermost structure 1310, first and second driving structures 1325A and 1325B, first and second sensing structures 1315A and 1315B. However, the gyroscope 1300 has a square shape, and the first and second driving structures 1325A and 1325B are coupled together via microbeam 1350.

Figure 14:
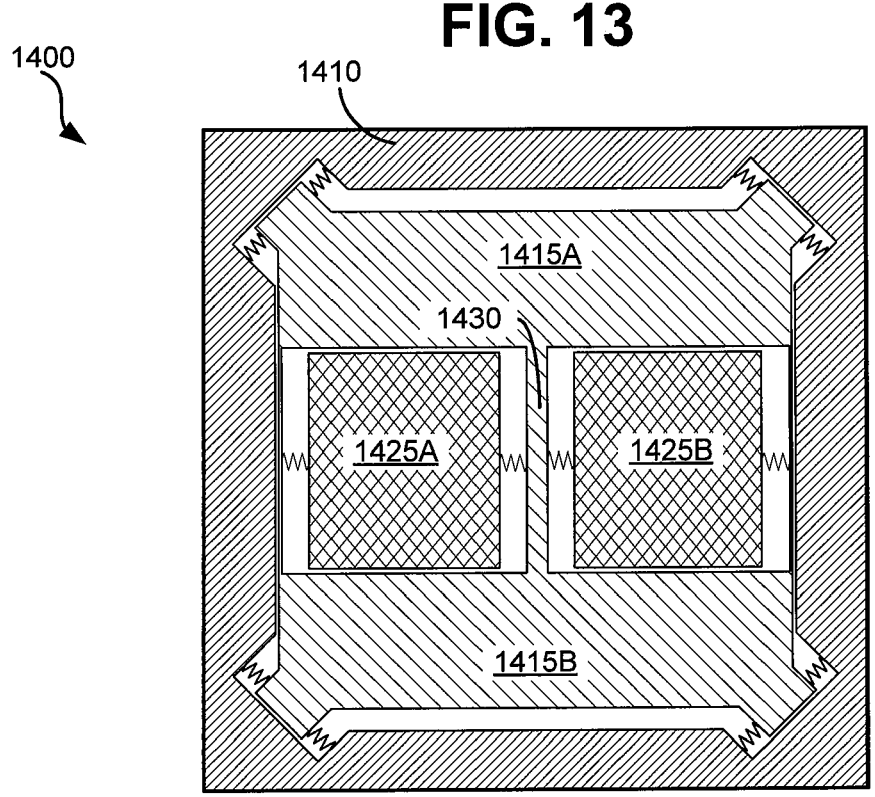

FIG. 14 is a top view of yet another embodiment of a gyroscope, such as that shown in FIG. 2, and is denoted generally by reference numeral 1400. The design and architecture of the gyroscope 1400 is similar to the gyroscope 1300 of FIG. 13, which includes an outermost structure 1410, first and second driving structures 1425A and 1425B, first and second sensing structures 1415A and 1415B. However, the first and second sensing structures 1415A and 1415B include a divider 1430 between the first driving structure 1425A and the second driving structure 1425B, which separates and decouples the first and second driving structures 1425A and 1425B.

Figure 15:
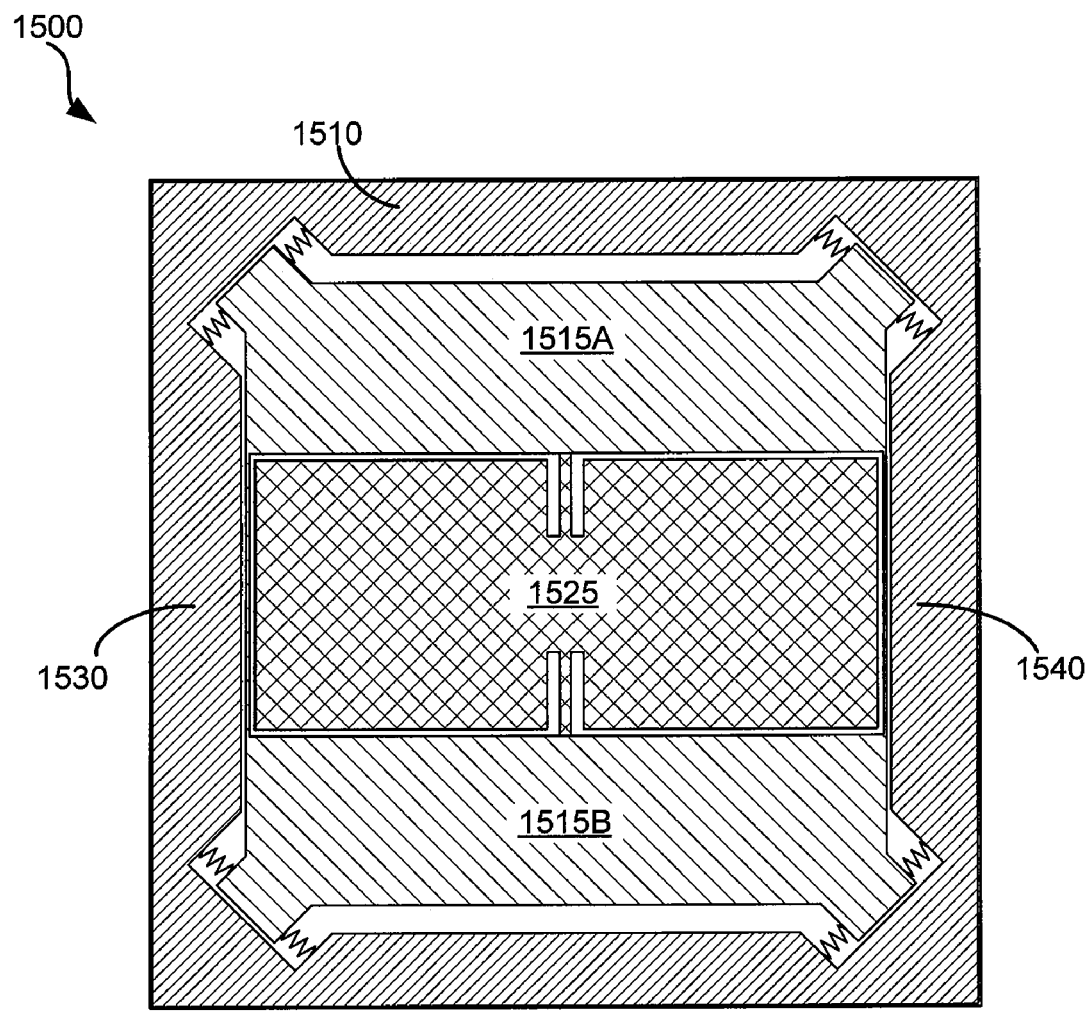

FIG. 15 is a top view of yet another embodiment of a gyroscope, such as that shown in FIG. 2, and is denoted generally by reference numeral 1500. The design and architecture of the gyroscope 1500 is similar to the gyroscope 1300 of FIG. 13, which includes an outermost structure 1510, and first and second sensing structures 1515A and 1515B. However, a driving structure 1525 extends from a left side wall 1530 to a right side wall 1540 of the outermost structure 1510. The driving structure 1525 is design and arranged to move about the Y-axis. It should be noted that the gyroscope described above has having either a square or an octagonal shape; however, the shape of the gyroscope can further include: circular, rectangular, or any other polygonal shapes.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A microelectromechanical systems (MEMS) gyroscope comprising:
   a top substrate including:
      an outermost structure;
      a first driving structure disposed within the outermost structure, the first driving structure including first driving electrodes disposed on a bottom surface of the first driving structure;
   a bottom substrate disposed below the top substrate, the bottom substrate including second driving electrodes disposed on a top surface of the bottom substrate, the second driving electrodes substantially aligned below the first driving electrodes such that a force can be applied to the first driving structure by an electrostatic force generated between the first and second driving electrodes, where the first and second driving electrodes are further configured to provide a capacitance signal based on the movement of the first driving structure, the capacitance signal being generated based on the first driving structure moving relative to the second driving electrodes;
   a first sensing structure comprising first sensing electrodes disposed on a bottom surface of the first sensing structure along at least one side wall of the first sensing structure, the first sensing electrodes being aligned substantially parallel to the at least one side wall of the first sensing structure, and
   the bottom substrate further includes second sensing electrodes disposed on the top surface of the bottom substrate, the second sensing electrodes substantially aligned below the first sensing electrodes of the first sensing structure, where the first and second sensing electrodes are configured to provide a capacitance signal based on the movement of the first sensing structure, the capacitance signal being generated based on the first sensing structure moving relative to the second sensing electrodes, wherein the first driving electrodes are disposed adjacent and perpendicular to the first sensing electrodes.

2. The MEMS gyroscope as defined in claim 1, wherein the top substrate further includes a second driving structure disposed within the outermost structure, the second driving structure adjacent to the first driving structure, the second driving structure including third driving electrodes disposed on a bottom surface of the second driving structure, and
   the bottom substrate further includes fourth driving electrodes disposed on the top surface of the bottom substrate, the fourth driving electrodes substantially aligned below the third driving electrodes such that a force can be applied to the second driving structure by an electrostatic force generated between the third and fourth driving electrodes, where the third and fourth driving electrodes are further configured to provide a capacitance signal based on the movement of the second driving structure, the capacitance signal being generated based on the second driving structure moving relative to the fourth driving electrodes and fourth sensing electrodes.

3. The MEMS gyroscope as defined in claim 2, wherein the second driving structure further includes third sensing electrodes disposed on the bottom surface of the second driving structure, the third sensing electrodes being disposed adjacent and perpendicular to the third driving electrodes, and
   the bottom substrate further includes fourth sensing electrodes disposed on the top surface of the bottom substrate, the fourth sensing electrodes substantially aligned below the third sensing electrodes of the second driving structure, where the third and fourth sensing electrodes are configured to provide a capacitance signal based on the movement of the first sensing second driving structure, the capacitance signal being generated based on the first sensing second driving structure moving relative to the fourth sensing electrodes.

4. The MEMS gyroscope as defined in claim 2, wherein the outermost structure includes a divider between the first driving structure and the second driving structure.

5. The MEMS gyroscope as defined in claim 1, further comprising a second driving structure disposed within the outermost structure, the second driving structure including third driving electrodes disposed on a bottom surface of the second driving structure; and
   the bottom substrate further includes fourth driving electrodes disposed on the top surface of the bottom substrate, the fourth driving electrodes substantially aligned below the third driving electrodes.

6. The MEMS gyroscope as defined in claim 5, wherein a force can be applied to the second driving structure by an electrostatic force generated between the third and fourth driving electrodes, where the third and fourth driving electrodes are further configured to provide a capacitance signal based on the movement of the second driving structure, the capacitance signal being generated based on the second driving structure moving relative to the fourth driving electrodes.

7. The MEMS gyroscope as defined in claim 5, further comprising a first sensing structure disposed within the outermost structure and adjacent to the first and second driving structures, the first sensing structure including third sensing electrodes disposed on a bottom surface of the first sensing structure; and
   the bottom substrate further includes second sensing electrodes disposed on the top surface of the bottom substrate, the second sensing electrodes substantially aligned below the first sensing electrodes.

8. The MEMS gyroscope as defined in claim 1, further comprising a cap wafer, where cap wafer, the top substrate, and the bottom substrate are hermetically sealed to maintain a vacuum adjacent to the driving and sensing structures.

9. A microelectromechanical systems (MEMS) gyroscope comprising:
   a top substrate including:
      an outermost structure;
      a first sensing structure disposed within the outermost structure, the first sensing structure including first sensing electrodes disposed on a bottom surface of the first sensing structure along at least one side wall of the first sensing structure, the first sensing electrodes being aligned substantially parallel to the at least one side wall of the first sensing structure, and
      a first driving structure that is disposed within the first sensing structure, the first driving structure including first driving electrodes disposed on a bottom surface of the first driving structure; and
   a bottom substrate disposed below the top substrate, the bottom substrate including second driving electrodes disposed on a top surface of the bottom substrate, the second driving electrodes substantially aligned below the first driving electrodes such that a force can be applied to the first driving structure by an electrostatic force generated between the first and second driving electrodes, where the first and second driving electrodes are further configured to provide a capacitance signal based on the movement of the first driving structure, the capacitance signal being generated based on the first driving structure moving relative to the second driving electrodes, wherein the first driving electrodes are disposed adjacent and perpendicular to the first sensing electrodes.

10. The MEMS gyroscope as defined in claim 9, wherein the bottom substrate further includes second sensing electrodes disposed on the top surface of the bottom substrate, the second sensing electrodes substantially aligned below the first sensing electrodes, where the first and second sensing electrodes are configured to provide a capacitance signal based on the movement of the first sensing structure, the capacitance signal being generated based on the first sensing structure moving relative to the second sensing electrodes.

11. The MEMS gyroscope as defined in claim 10, wherein the top substrate further includes a second driving structure disposed within the first sensing structure, the second driving structure opposite to the first driving structure, the second driving structure including third driving electrodes disposed on a bottom surface of the second driving structure; and
the bottom substrate further includes fourth driving electrodes disposed on the top surface of the bottom substrate, the fourth driving electrodes substantially aligned below the third driving electrodes.

12. The MEMS gyroscope as defined in claim 11, wherein the first sensing structure includes a divider between the first driving structure and the second driving structure.

13. The MEMS gyroscope as defined in claim 11, wherein the top substrate further includes a center member disposed within the first sensing structure and between the first driving structure and the second driving structure.

14. The MEMS gyroscope as defined in claim 13, wherein the top substrate further includes a third driving structure and a fourth driving structure disposed within the first sensing structure, the third and fourth driving structures disposed perpendicular to the first and second driving structures, the center member disposed between the third and fourth driving structures, the third driving structure including fifth driving electrodes disposed on a bottom surface of the third driving structure, the fourth driving structure including sixth driving electrodes disposed on a bottom surface of the fourth driving structure; and
the bottom substrate further includes seventh and eighth driving electrodes disposed on the top surface of the bottom substrate, the seventh driving electrodes substantially aligned below the fifth driving electrodes and the eighth driving electrodes substantially aligned below the sixth driving electrodes.

15. The MEMS gyroscope as defined in claim 10, wherein the top substrate further includes a second driving structure disposed within a second sensing structure, the second sensing structure disposed within the outermost structure and adjacent to the first sensing structure, the second driving structure including third driving electrodes disposed on a bottom surface of the second driving structure, the second sensing structure including third sensing electrodes disposed on a bottom surface of the second sensing structure along at least one side wall of the second sensing structure, the third sensing electrodes being aligned substantially parallel to the at least one side wall of the second sensing structure; and
the bottom substrate further includes fourth driving electrodes and fourth sensing electrodes disposed on the top surface of the bottom substrate, the fourth driving electrodes substantially aligned below the third driving electrodes and the fourth sensing electrodes substantially aligned below the third sensing electrodes.

16. The MEMS gyroscope as defined in claim 15, wherein the outermost structure includes a divider between the first sensing structure and the second sensing structure.

17. The MEMS gyroscope as defined in claim 15, wherein the first sensing structure and the second sensing structure have a C-shape, the open ends of the first sensing structure and the second sensing structure being adjacent to each other.

18. A microelectromechanical systems (MEMS) gyroscope comprising:
a top substrate including:
an outermost structure; and
a first driving structure disposed within the outermost structure, the first driving structure including first driving electrodes disposed on a bottom surface of the first driving structure; and
a bottom substrate disposed below the top substrate, the bottom substrate including second driving electrodes disposed on a top surface of the bottom substrate, the second driving electrodes substantially aligned below the first driving electrodes such that a force can be applied to the first driving structure by an electrostatic force generated between the first and second driving electrodes, where the first and second driving electrodes are further configured to provide a capacitance signal based on the movement of the first driving structure, the capacitance signal being generated based on the first driving structure moving relative to the second driving electrodes;
a first sensing structure comprising first sensing electrodes disposed on a bottom surface of the first sensing structure along at least one side wall of the first sensing structure, the first sensing electrodes being aligned substantially parallel to the at least one side wall of the first sensing structure, and
the bottom substrate further includes second sensing electrodes disposed on the top surface of the bottom substrate, the second sensing electrodes substantially aligned below the first sensing electrodes of the first sensing structure, where the first and second sensing electrodes are configured to provide a capacitance signal based on the movement of the first sensing structure, the capacitance signal being generated based on the first sensing structure moving relative to the second sensing electrodes;
wherein the top substrate further includes a second driving structure disposed within the outermost structure, the second driving structure adjacent to the first driving structure, the second driving structure including third driving electrodes disposed on a bottom surface of the second driving structure, and
the bottom substrate further includes fourth driving electrodes disposed on the top surface of the bottom substrate, the fourth driving electrodes substantially aligned below the third driving electrodes such that a force can be applied to the second driving structure by an electrostatic force generated between the third and fourth driving electrodes, where the third and fourth driving electrodes are further configured to provide a capacitance signal based on the movement of the second driving structure, the capacitance signal being generated based on the second driving structure moving relative to the fourth driving electrodes and fourth sensing electrodes, wherein the second driving structure further includes third sensing electrodes disposed on the bottom surface of the second driving structure, the third sensing electrodes being disposed adjacent and perpendicular to the third driving electrodes, and wherein
the bottom substrate further includes fourth sensing electrodes disposed on the top surface of the bottom substrate, the fourth sensing electrodes substantially aligned below the third sensing electrodes of the second driving structure, where the third and fourth sensing electrodes are configured to provide a capacitance signal based on the movement of the first sensing second driving structure, the capacitance signal being generated based on the first sensing second driving structure moving relative to the fourth sensing electrodes.

19. The MEMS gyroscope as defined in claim 18, wherein the outermost structure includes a divider between the first driving structure and the second driving structure.

20. A microelectromechanical systems (MEMS) gyroscope comprising:
a top substrate including:
an outermost structure;
a first sensing structure disposed within the outermost structure, the first sensing structure including first sensing electrodes disposed on a bottom surface of the first sensing structure along at least one side wall of the first sensing structure, the first sensing electrodes being aligned substantially parallel to the at least one side wall of the first sensing structure, and
a first driving structure that is disposed within the first sensing structure, the first driving structure including first driving electrodes disposed on a bottom surface of the first driving structure; and
a bottom substrate disposed below the top substrate, the bottom substrate including second driving electrodes disposed on a top surface of the bottom substrate, the second driving electrodes substantially aligned below the first driving electrodes such that a force can be applied to the first driving structure by an electrostatic force generated between the first and second driving electrodes, where the first and second driving electrodes are further configured to provide a capacitance signal based on the movement of the first driving structure, the capacitance signal being generated based on the first driving structure moving relative to the second driving electrodes, wherein the bottom substrate further includes second sensing electrodes disposed on the top surface of the bottom substrate, the second sensing electrodes substantially aligned below the first sensing electrodes, where the first and second sensing electrodes are configured to provide a capacitance signal based on the movement of the first sensing structure, the capacitance signal being generated based on the first sensing structure moving relative to the second sensing electrodes,
wherein the top substrate further includes a second driving structure disposed within the first sensing structure, wherein the first sensing structure is movable relative to the first driving structure and the second driving structure, the second driving structure opposite to the first driving structure, the second driving structure including third driving electrodes disposed on a bottom surface of the second driving structure; and
the bottom substrate further includes fourth driving electrodes disposed on the top surface of the bottom substrate, the fourth driving electrodes substantially aligned below the third driving electrodes.

21. The MEMS gyroscope as defined in claim 20, wherein the first sensing structure includes a divider between the first driving structure and the second driving structure.

22. The MEMS gyroscope as defined in claim 20, wherein the top substrate further includes a center member disposed within the first sensing structure and between the first driving structure and the second driving structure.

23. A microelectromechanical systems (MEMS) gyroscope comprising:
a top substrate including:
an outermost structure;
a first sensing structure disposed within the outermost structure, the first sensing structure including first sensing electrodes disposed on a bottom surface of the first sensing structure along at least one side wall of the first sensing structure, the first sensing electrodes being aligned substantially parallel to the at least one side wall of the first sensing structure, and
a first driving structure that is disposed within the first sensing structure, the first driving structure including first driving electrodes disposed on a bottom surface of the first driving structure; and
a bottom substrate disposed below the top substrate, the bottom substrate including second driving electrodes disposed on a top surface of the bottom substrate, the second driving electrodes substantially aligned below the first driving electrodes such that a force can be applied to the first driving structure by an electrostatic force generated between the first and second driving electrodes, where the first and second driving electrodes are further configured to provide a capacitance signal based on the movement of the first driving structure, the capacitance signal being generated based on the first driving structure moving relative to the second driving electrodes, wherein the bottom substrate further includes second sensing electrodes disposed on the top surface of the bottom substrate, the second sensing electrodes substantially aligned below the first sensing electrodes, where the first and second sensing electrodes are configured to provide a capacitance signal based on the movement of the first sensing structure, the capacitance signal being generated based on the first sensing structure moving relative to the second sensing electrodes,
wherein the top substrate further includes a second driving structure disposed within a second sensing structure, the second sensing structure disposed within the outermost structure and adjacent to the first sensing structure, the second driving structure including third driving electrodes disposed on a bottom surface of the second driving structure, the second sensing structure including third sensing electrodes disposed on a bottom surface of the second sensing structure along at least one side wall of the second sensing structure, the third sensing electrodes being aligned substantially parallel to the at least one side wall of the second sensing structure; and
the bottom substrate further includes fourth driving electrodes and fourth sensing electrodes disposed on the top surface of the bottom substrate, the fourth driving electrodes substantially aligned below the third driving electrodes and the fourth sensing electrodes substantially aligned below the third sensing electrodes.

24. The MEMS gyroscope as defined in claim 23, wherein the outermost structure includes a divider between the first sensing structure and the second sensing structure.

25. The MEMS gyroscope as defined in claim 23, wherein the first sensing structure and the second sensing structure have a C-shape, the open ends of the first sensing structure and the second sensing structure being adjacent to each other.

26. The MEMS gyroscope as defined in claim 23, wherein the second driving structure is movable independent of the first driving structure and the second sensing structure.

27. A microelectromechanical systems (MEMS) gyroscope comprising:
a top substrate including:
an outermost structure;

a first sensing structure disposed within the outermost structure, the first sensing structure including first sensing electrodes disposed on a bottom surface of the first sensing structure along at least one side wall of the first sensing structure, the first sensing electrodes being aligned substantially parallel to the at least one side wall of the first sensing structure, and a first driving structure that is disposed within the first sensing structure, the first driving structure including first driving electrodes disposed on a bottom surface of the first driving structure; and a bottom substrate disposed below the top substrate, the bottom substrate including second driving electrodes disposed on a top surface of the bottom substrate, the second driving electrodes substantially aligned below the first driving electrodes such that a force can be applied to the first driving structure by an electrostatic force generated between the first and second driving electrodes, where the first and second driving electrodes are further configured to provide a capacitance signal based on the movement of the first driving structure, the capacitance signal being generated based on the first driving structure moving relative to the second driving electrodes, wherein the bottom substrate further includes second sensing electrodes disposed on the top surface of the bottom substrate, the second sensing electrodes substantially aligned below the first sensing electrodes, where the first and second sensing electrodes are configured to provide a capacitance signal based on the movement of the first sensing structure, the capacitance signal being generated based on the first sensing structure moving relative to the second sensing electrodes, wherein the top substrate further includes a second driving structure disposed within the first sensing structure, the second driving structure opposite to the first driving structure, the second driving structure including third driving electrodes disposed on a bottom surface of the second driving structure; and the bottom substrate further includes fourth driving electrodes disposed on the top surface of the bottom substrate, the fourth driving electrodes substantially aligned below the third driving electrodes, wherein the top substrate further includes a center member disposed within the first sensing structure and between the first driving structure and the second driving structure.

* * * * *